United States Patent
Min et al.

[11] Patent Number: 6,118,818
[45] Date of Patent: Sep. 12, 2000

[54] METHOD FOR DECODING MPEG STANDARD VIDEO BIT STREAM

[75] Inventors: Cheol-Hong Min; Suhwan Kim; Seong-Jai Min; Seong Ok Bae, all of Seoul, Rep. of Korea

[73] Assignee: LG Electronics, Inc., Seoul, Rep. of Korea

[21] Appl. No.: 08/831,865

[22] Filed: Apr. 2, 1997

[30] Foreign Application Priority Data

Apr. 9, 1996 [KR] Rep. of Korea ...................... 96-10658

[51] Int. Cl.$^7$ ................................ H04B 1/66; H04N 7/12

[52] U.S. Cl. .......................... 375/240; 348/419; 348/715

[58] Field of Search ..................................... 348/409, 415, 348/446, 443, 454, 419, 714, 715, 716, 439, 523, 513, 526, 441, 402, 416, 426; 382/233; 375/240

[56] References Cited

U.S. PATENT DOCUMENTS

| | | | |
|---|---|---|---|
| 5,220,425 | 6/1993 | Enari et al. ............................. | 348/715 |
| 5,386,233 | 1/1995 | Keith ....................................... | 348/407 |
| 5,398,072 | 3/1995 | Auld ....................................... | 348/426 |
| 5,502,494 | 3/1996 | Auld ....................................... | 348/426 |
| 5,561,465 | 10/1996 | Fautier et al. .......................... | 348/415 |
| 5,646,693 | 7/1997 | Cismas ................................... | 348/416 |

FOREIGN PATENT DOCUMENTS 0 710 028  5/1996  European Pat. Off. .
0 732 857  9/1996  European Pat. Off. .

OTHER PUBLICATIONS

I. Tamitani, et al., An Encoder/Decoder Chip Set for the MPEG Video Standard, Digital Signal Processing 2, Estimation, VLSI, San Francisco, Mar. 23–26, 1992, vol. 5, Mar. 23, 1992, IEEE, pp. 661–664.

*Primary Examiner*—Chris S. Kelley
*Assistant Examiner*—Gims Philippe
*Attorney, Agent, or Firm*—Long, Aldridge & Norman LLP

[57] ABSTRACT

A method for decoding MPEG standard I (Intra-coded) and P (Predictive-coded) picture bit streams using a memory smaller than one video frame of data. The method includes the steps of receiving a video bit stream of an I picture and a video bit stream of a P picture in succession and storing the received video bit streams in a first memory, each of the I picture and the P picture having an up portion and a down portion, and each of the up and down portions having a top field and a bottom field; decoding the stored up portion of the I picture and storing the decoded up portion of the I picture in a first region of a second memory; decoding the stored down portion of the I picture and storing the decoded down portion of the I picture in a second region of the second memory; simultaneously decoding the stored up portion of the P picture and displaying the top fields of the up and down portions of the I picture stored in the first and second regions of the second memory and storing the up portion of the P picture in a third region of the second memory; and decoding the down portion of the P picture, waiting for display of the top fields of the up and down portions of the I picture and a predetermined number of scan lines of the bottom fields of the up and down portions I picture, and storing the decoded down portion of the P picture in the first region of the second memory.

16 Claims, 10 Drawing Sheets

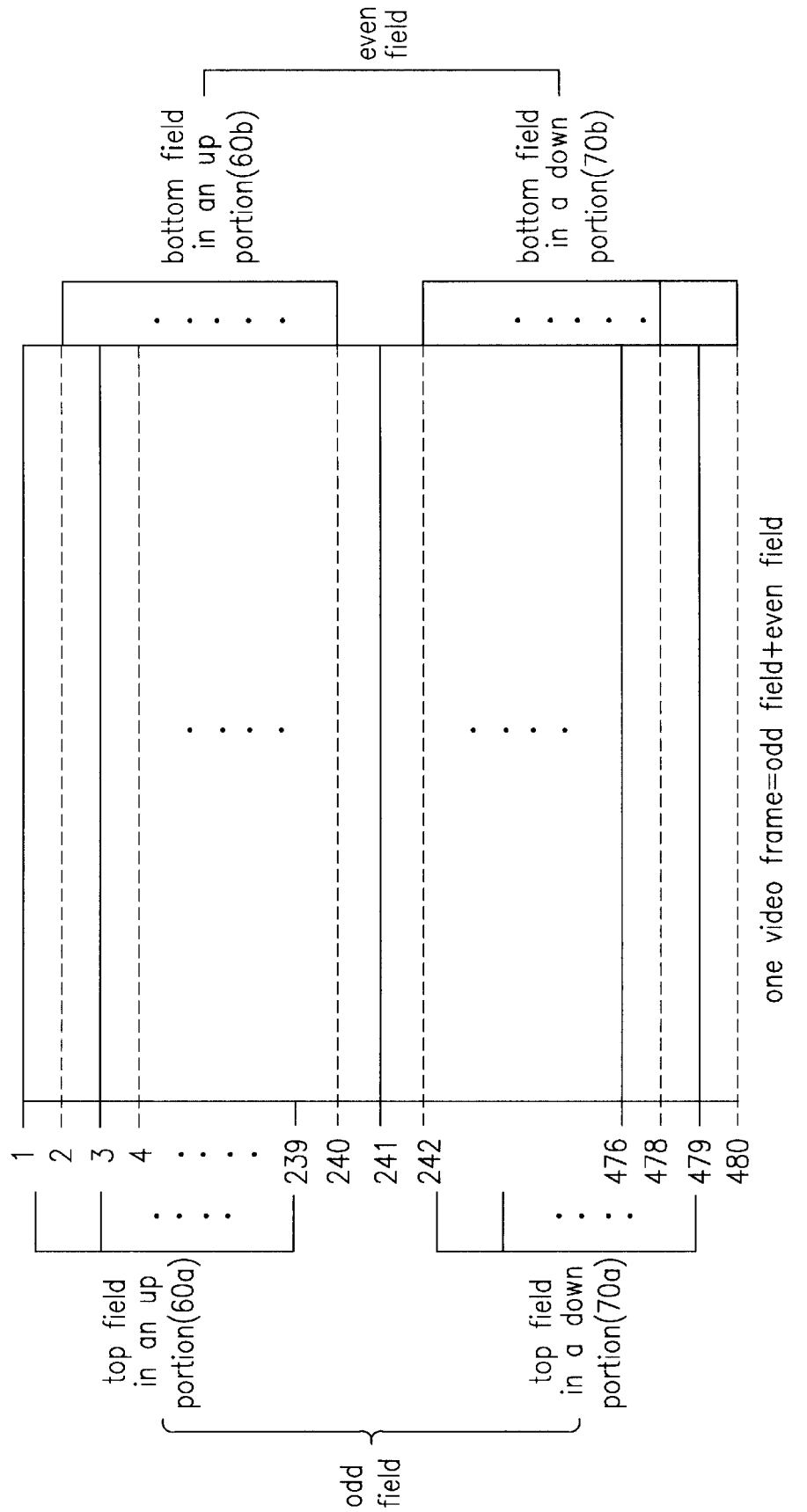

METHOD FOR DECODING MPEG STANDARD VIDEO BIT STREAM

BACKGROUND OF THE INVENTION

This application claims the benefit of Application No. 10658/1996, filed in Korea on Apr. 9, 1996, which is hereby incoprated by reference.

1. Field of the Invention

The present invention relates to a method for decoding MPEG (Moving Picture Expert Group) standard bit streams and, more particularly, to a method for decoding MPEG standard bit streams which requires less memory and can result in lower production costs.

2. Discussion of the Related Art

A conventional method for decoding MPEG standard video bit streams will be explained with reference to the attached drawings.

FIG. 1 is a block diagram of a system of a conventional device for decoding MPEG standard video bit streams. FIGS. 2a–2d are block diagrams showing frame memory structures. FIG. 3 illustrates a predictive structure between I, P and B picture data in a device for decoding an MPEG standard video bit stream In general, each video frame data in an MPEG standard digital video system is specified in pixel units, of which a large amount of information requires a video compression (or encoding) technique to reduce the amount of information for efficient transmission or storage. This video compression technique mainly uses a technique of eliminating duplicated information located between video frames in spatial and time regions. The duplicity in the spatial regions comes from the minute rate of variation between adjoining pixels within a video frame. The duplicity in the time regions comes from the minute rate of variation between adjoining video frames, i.e., the variation of the movement of an object.

As is well known, an MPEG standard video bit stream is coded to be divided into three types of streams on the transmission side. The three types of streams are the I (Intra-coded) picture video bit stream, the P (predictive-coded) picture video bit stream, and the B (bidirectional predictive-coded) picture video bit stream. Among these bit streams, the most basic video bit stream is the I video bit stream. The I video bit stream is used as reference data for formation of the P video bit stream. The I video bit stream and the P video bit stream, in turn, are used as reference data for formation of the B video bit stream. Thus, compression of a motion picture is made possible. When the three compressed types of video bit streams are decoded at the reception side, the same relation exists with respect to the video bit streams as existed at the transmission side.

Referring to FIG. 1, a device for decoding general MPEG standard bit streams includes a memory 10 for receiving and storing the compressed three types of video bit streams, a controlling part 20 for controlling the decoding, and a decoder 30 for decoding the I, P, and B video bit streams using the aforementioned relation and for storing the decoded video frame data in the memory 10 in succession. The decoding device in FIG. 1 is connected to a display 40 for displaying on a screen the decoded video bit streams stored in the memory 10 under the control of the controlling part 20, a storage device 50 for storing the decoded video frame data stored in the memory 10 by the controlling part 20, and a transmission line for transmitting the decoded video frame data stored in the memory 10 by the controlling part 20.

Referring to FIG. 2a, the video frame memory 10 shown in FIG. 1 includes a first region 10a for storing the decoded I video frame data in succession (i.e., a video bit stream), a second region 10b for storing the decoded I video frame data, a third region 10c for storing the decoded P video frame data, and a fourth region 10d for storing the decoded B video frame data.

For implementation of a motion picture, the MPEG standard bit streams may only include two types of bit streams, i.e., the I and P picture bit streams. In this case, the fourth region 10d in the memory shown in FIG. 2a will not be used. Instead, only the first to third regions 10a–10c will be used. In this situation, the second region lob and the third region 10c shown in FIG. 2a may be represented as shown in FIG. 2d; the second region 10b may be divided into a region 10b1 for storing an up portion of the I picture video frame data and a region 10b2 for storing a down portion of the I picture video frame data; and the third region 10c may be divided into a region 10c1 for storing an up portion of the P picture video frame data and a region 10c2 for storing a down portion of the P picture video frame data.

In the conventional decoding method, upon reception of the compressed I, P and B picture video bit streams from the transmission side (for example, a broadcasting station), the memory 10 shown in FIG. 1 stores the video bit streams in succession. Under the control of the controlling part 20, the decoder 30 reads in the stored video bit streams in succession and decodes them into the I, P and B picture video frame data, which are then stored in respective regions 10b–10d of the memory 10 by the controlling part 20. As each of the second to fourth regions 10b–10d of FIG. 2b is adapted to store respective decoded video frame data, each of them has the capacity to store an entire set of data for one entire video frame. Once the I, P and B picture video frame data are completely stored in respective regions 10b–10d of the memory 10, the controlling part 20 displays them on the display 40, transfers them to another storage device 50 as the case demands, or transmits them through the transmission line for a transmission to another device. The decoder 30 refers to backward I picture video bit streams stored in the first region 10a, B picture video bit streams, and backward P picture video bit streams, when the decoder 30 decodes the P picture video bit stream.

When coded at the transmission side, each of the MPEG standard video bit streams has a system of configuration as shown in FIG. 2b. Referring to FIG. 2b, one of the video bit streams compressed according to the MPEG standard includes an up portion 60 and a down portion 70. Each of these portions, in turn, has a top field 60a, 70a and a bottom field 60b, 70b.

A sequence of a single image reproduction from one MPEG standard video bit stream having the aforementioned system or configuration will be explained with reference to FIG. 2c. FIG. 2c illustrates an example of an interlace scanning NTSC broadcasting system.

Referring to FIGS. 2b and 2c, scan lines 1, 3, . . . , 239 belonging to the top field 60a of the up portion 60 are first displayed on a screen. Scan lines 241, . . . , 477, and 479 belonging to the top field 70a of the down portion 70 are then displayed on the screen. Next, scan lines 2, 4, . . . , 240 belonging to the bottom field 60b of the up portion 60 are displayed on a screen. Then, scan lines 242, . . . , 478 and 480 belonging to the bottom field 70b of the down portion 70 are displayed on the screen. That is, as shown in FIG. 2c, the top field 60a of the up portion 60 and the top field 70a of the down portion 70 compose an odd field, and the bottom field 60b of the up portion 60 and the bottom field 70b of the down portion 70 compose an even field. As is well known, one odd field and one even field together compose one video frame. In addition, in interlace scanning, at first, odd scan lines are displayed on the screen and then even scan lines are displayed on the screen.

As for the aforementioned explanation, in the conventional decoding method, by the decoding of the decoder 30, each of the I, P, and B picture video frame data is obtained, all of which data are stored in the respective regions 10b–10d of the memory 10 and displayed by the controlling part 20 according to a predetermined sequence. Therefore, each of the regions 10b–10d of the memory 10 should have a capacity which can store all the video frame data of each picture.

FIG. 2d illustrates a diagram showing details of the second region 10b and the third region 10c in the memory 10 for the I and P picture video frame data shown in FIG. 2a.

Referring to FIG. 2d, in the memory 10, the second region 10b includes a portion 10b1 for storing the up portion, and a portion 10b2 for storing the down portion, of the I picture video frame data. Also, the third region 10c includes a portion 10c1 for storing the up portion, and a portion 10c2 for storing the down portion, of the P picture video frame data. The capacity of each of the portions corresponds to 25% of the capacity capable of storing all of the I and P picture video frame data.

The I, P and B picture video frame data, thus stored in the second to fourth regions 10b–10d of the memory 10, are either displayed by the display 40 according to a predetermined sequence, stored in the storage device 50, or transmitted to another device through the transmission line, by the controlling part 20.

FIG. 3 illustrates a system of reference illustrating the relationship between the MPEG standard I, P and B picture video frames in encoding.

In the MPEG standard, an I sequence of a motion picture is encoded in a plurality of video frames, i.e., in units of groups. Each such group includes a plurality of video frames. As has been explained, the plurality of video frames in each group includes I (Intra-coded) video frame data, P (Predictive-coded) video frame data, and B (Bidirectionally predictive-coded) video frame data.

The relationship of reference between these three video frame data is shown in FIG. 3.

Referring to FIG. 3, in each group, P picture video frame data are encoded with reference to their forward I picture video frame data, B picture video frame data are encoded with reference to their backward I picture frame data and their forward P picture video frame data. These frame data also have the same relations or relationships in decoding. The arrows in FIG. 3 indicate directions of the references. Since the I picture video bit stream is encoded only with information from itself, the compression ratio is not comparatively high. The P picture video bit stream is encoded referring to a backward I picture frame or other backward P picture frame. In this case, since the P picture video bit stream is encoded by synchronous compensation, a compression ratio higher than the I picture video bit stream can be obtained. However, because the P picture frame is encoded referring to a backward P picture frame at times, slight coding errors may occur. In the meantime, the B picture frame is encoded referring to backward and forward I and P pictures simultaneously, so that a highly compressed B picture video frame is obtainable. In the MPEG algorithm, the frequency and positions of I picture frames are selected dependent on a random accessibility or a frequency of scene change. In general, there are close correlations between video frames in a motion picture.

If all the MPEG standard I, P, and B picture video frame data are applied, the maximum size of one picture is about 1.49 Mbyte in the NTSC broadcasting system and 1.78 Mbyte in the PAL broadcasting system. Therefore, an adequate size of memory for those capacities is required in decoding. In addition to this, if the first region 10a shown in FIG. 2a, which is provided for storing received video bit streams, is taken into account, a size of memory having a capacity more than 2 Mbyte is required.

As has been explained, it is possible that the MPEG standard video bit streams may be encoded with only I and P picture video frames without B picture video frames. In this case, a memory of 0.99 Mbyte capacity is required for decoding in the NTSC broadcasting system, and a memory of 1.19 Mbyte capacity is required for decoding in the PAL broadcasting system. In this case, since only the I and P picture frame data are stored, a memory is required which has a capacity reduced by one frame data from a main profile that stores all the I, P, and B picture video frame data. However, since a memory having a capacity much greater than 1 Mbyte is still required, there has been a problem that production cost of a video appliance remains high.

SUMMARY OF THE INVENTION

Accordingly, the present invention is directed to a method for decoding MPEG standard video bit streams that substantially obviates one or more of the problems due to limitations and disadvantages of the related art.

An object of the present invention is to provide a method for decoding MPEG standard video bit streams which can, among other things, reduce a capacity of a memory for use in decoding the bit streams.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, the method for decoding MPEG standard video bit streams includes the steps of receiving a video bit stream of an I (Intra-coded) picture and a video bit stream of a P (Predictive-coded) picture in succession and storing the received video bit streams in a first memory, each of the I picture and the P picture having an up portion and a down portion, and each of the up and down portions having a top field and a bottom field; decoding the stored up portion of the I picture and storing the decoded up portion of the I picture in a first region of a second memory; decoding the stored down portion of the I picture and storing the decoded down portion of the I picture in a second region of the second memory; simultaneously decoding the stored up portion of the P picture and displaying the top fields of the up and down portions of the I picture stored in the first and second regions of the second memory and storing the up portion of the P picture in a third region of the second memory; and decoding the down portion of the P picture, waiting for display of the top fields of the up and down portions of the I picture and a predetermined number of scan lines of the bottom fields of the up and down portions of the I picture, and storing the decoded down portion of the P picture in the first region of the second memory.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the drawings.

In the drawings:

FIGS. 2a–2d are block diagrams showing conventional frame memory structures;

DETAILED DESCRIPTION OF THE PREFERRED EMBODIMENTS

Reference will now be made in detail to the preferred embodiments of the present invention, examples of which are illustrated in the accompanying drawings.

Figure 1:
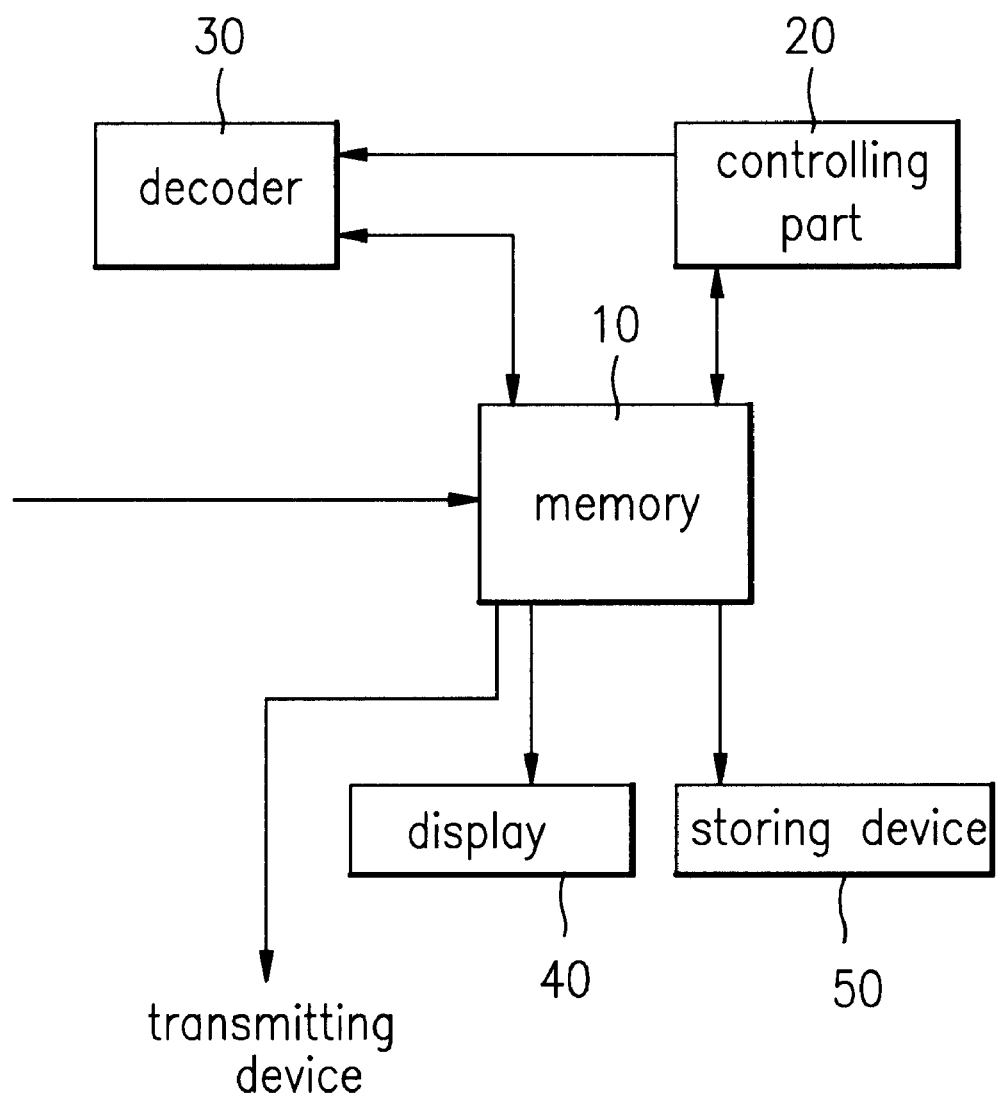
FIG. 1 illustrates a block diagram of a system of a conventional device for decoding MPEG standard video bit streams.

An explanation of a decoding device in a video appliance of the present invention will be omitted here because the decoding system structure of the present invention is the same as that for the conventional device shown in FIG. 1. The objective of the decoding method of the present invention is carried out using or working with a system program to be stored in, for example, the memory 10 shown in FIG. 1. Of the MPEG standard three types of pictures, the two types of pictures, i.e., I and P pictures, are applicable to a preferred embodiment of the method of the present invention. The method of a preferred embodiment of the present invention is applicable to the NTSC broadcasting system that has an interlaced scanning system.

Figure 4:
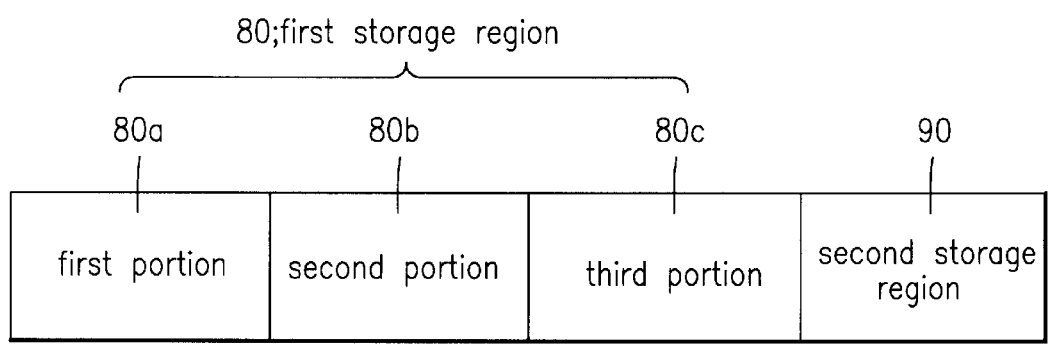
FIG. 4 illustrates a frame memory structure, in connection with which only I and P pictures are decoded, in accordance with a preferred embodiment of the present invention.
Figure 5A:
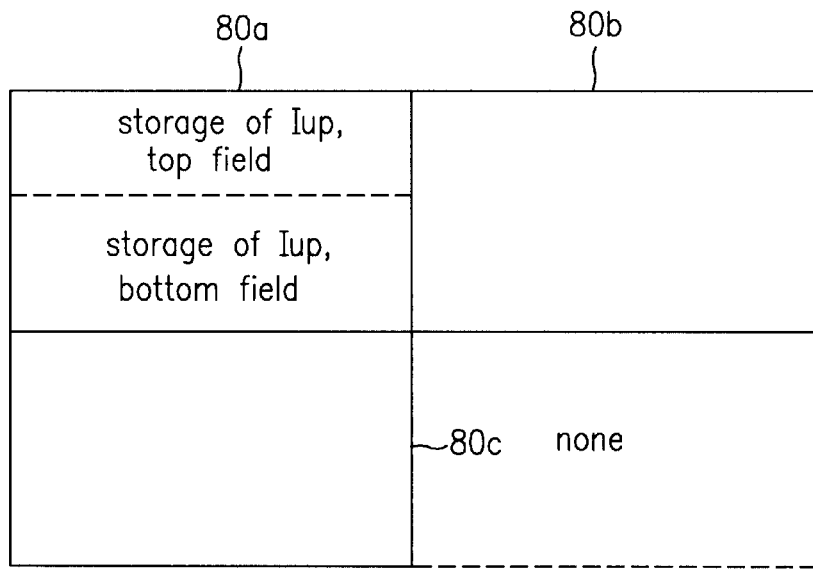
FIGS. 5a–5f illustrate the steps of a process, in connection with which video data having been applied to each of a plurality of decoding regions of a frame memory are decoded, in an MPEG decoder in accordance with the present invention.
Figure 5B:
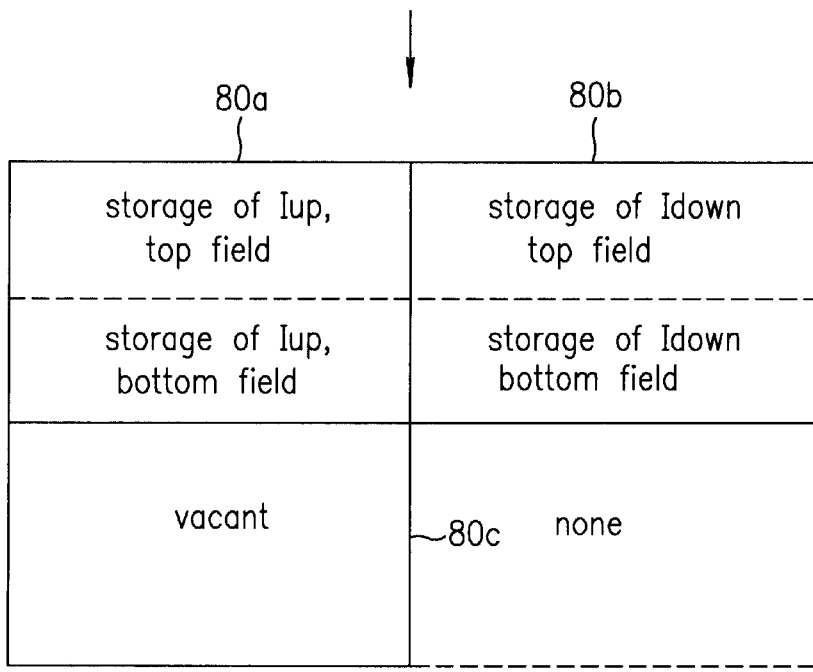

The memory 10 shown in FIG. 1 has a structure such as shown in FIG. 4 for implementing the method of a preferred embodiment of the present invention. FIGS. 5a–5f illustrate the steps of a process, in connection with which video data applied to each of a plurality of decoding regions of a frame memory are decoded, in an MPEG decoder in accordance with the present invention. FIG. 6 is a flowchart showing a method for decoding video on a frame memory in an MPEG decoder in accordance with the present invention.

Referring to FIG. 4, the memory 10 in FIG. 1 has a first storage region 80 for storage of I and P picture video frame data, and a second storage region or portion 90 for storage of bit streams. The first storage region 80 has a first portion 80a, a second portion 80b and a third portion 80c. Each of the portions 80a–80c has a capacity which can store 25% of each video frame data. Accordingly, the first storage region 80 of the memory for use in decoding has a capacity which can store only 75% of each video frame data. Thus, portions 80a, 80b, and 80c of the first storage region 80 have ¾ of the capacity of the conventional memory used in the MPEG decoder. The first storage region 80 of the memory 10 has a capacity which can decode only an I picture video bit stream, which is a basic picture, and a P picture video bit stream, which refers to the I picture video bit stream as a basic picture in carrying out motion compensation. In the decoding method of the present invention, the capacity of the memory required for the device for decoding MPEG bit streams is about 0.74 Mbyte in the case of the NTSC broadcasting system, and about 0.89 Mbyte in the case of the PAL broadcasting system. Thus, as has been explained, the capacity of a memory required for a preferred embodiment of a decoding device of the present invention does not exceed 1 Mbyte in the case of any broadcasting system, NTSC, PAL or otherwise.

The method for decoding MPEG standard video bit streams in accordance with the present invention will now be explained with reference to FIGS. 5a–5f and 6.

Referring to FIGS. 5a–5f and 6, the memory 10 receives MPEG standard I and P picture video bit streams in succession from a transmission side (for example, a broadcasting system) and stores the streams in the second region 90 in FIG. 4 under the control of the controlling part 20. When the I and P picture video bit streams are stored in the second storage region 90 of FIG. 4, the decoder 30 shown in FIG. 1 reads in and decodes the bit streams.

Figure 2A:
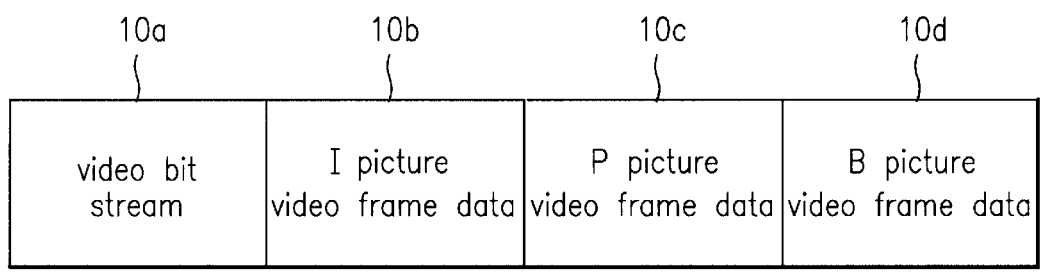
Figure 2B:
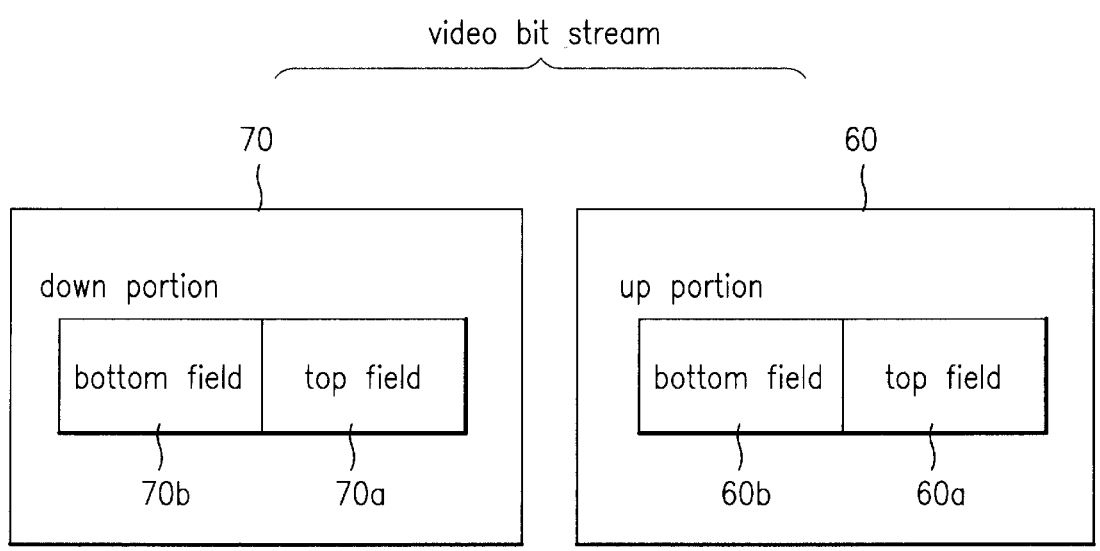

As shown in FIG. 2b, each of the video bit streams has an up portion and a down portion, and each of the up and down portions has a top field and a bottom field. Accordingly, as shown in FIG. 5a and in step S101 in FIG. 6, the decoder 30 first decodes the up portion of the I picture video bit stream Iup, which is a reference video, and stores it in the first portion 80a of the first region 80 in the memory 10. As the up portion has a top field and a bottom field, the top field is stored first and then the bottom field is stored. Next, the down portion of the I picture video bit stream is decoded and stored in the second portion 80b of the second storage region 80 in the order of the top field and the bottom field as shown in FIG. 5b and in step S101 in FIG. 6.

Figure 5C:
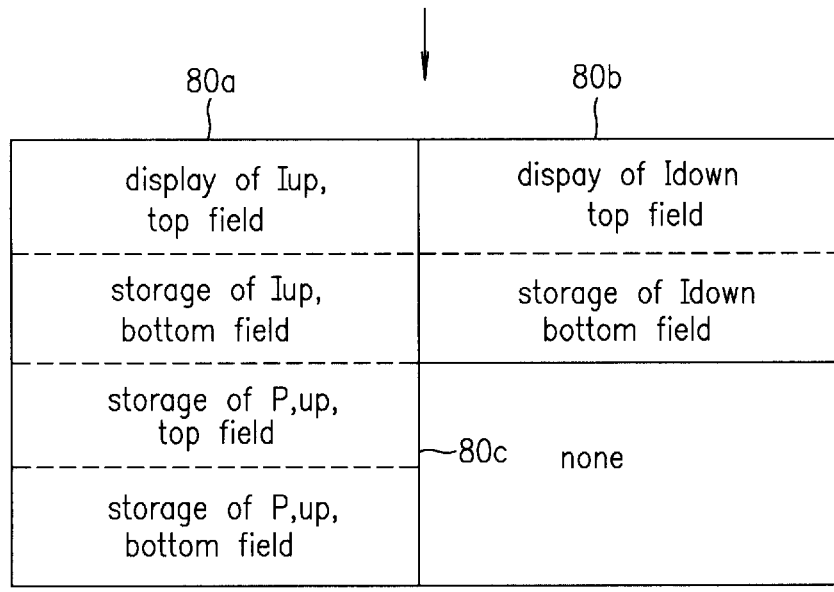
Figure 5D:
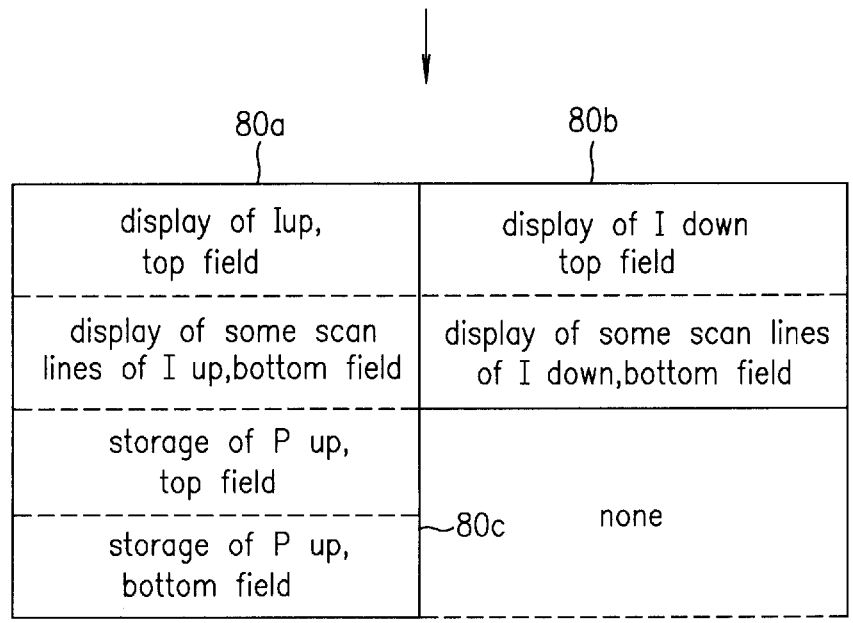
Figure 6:
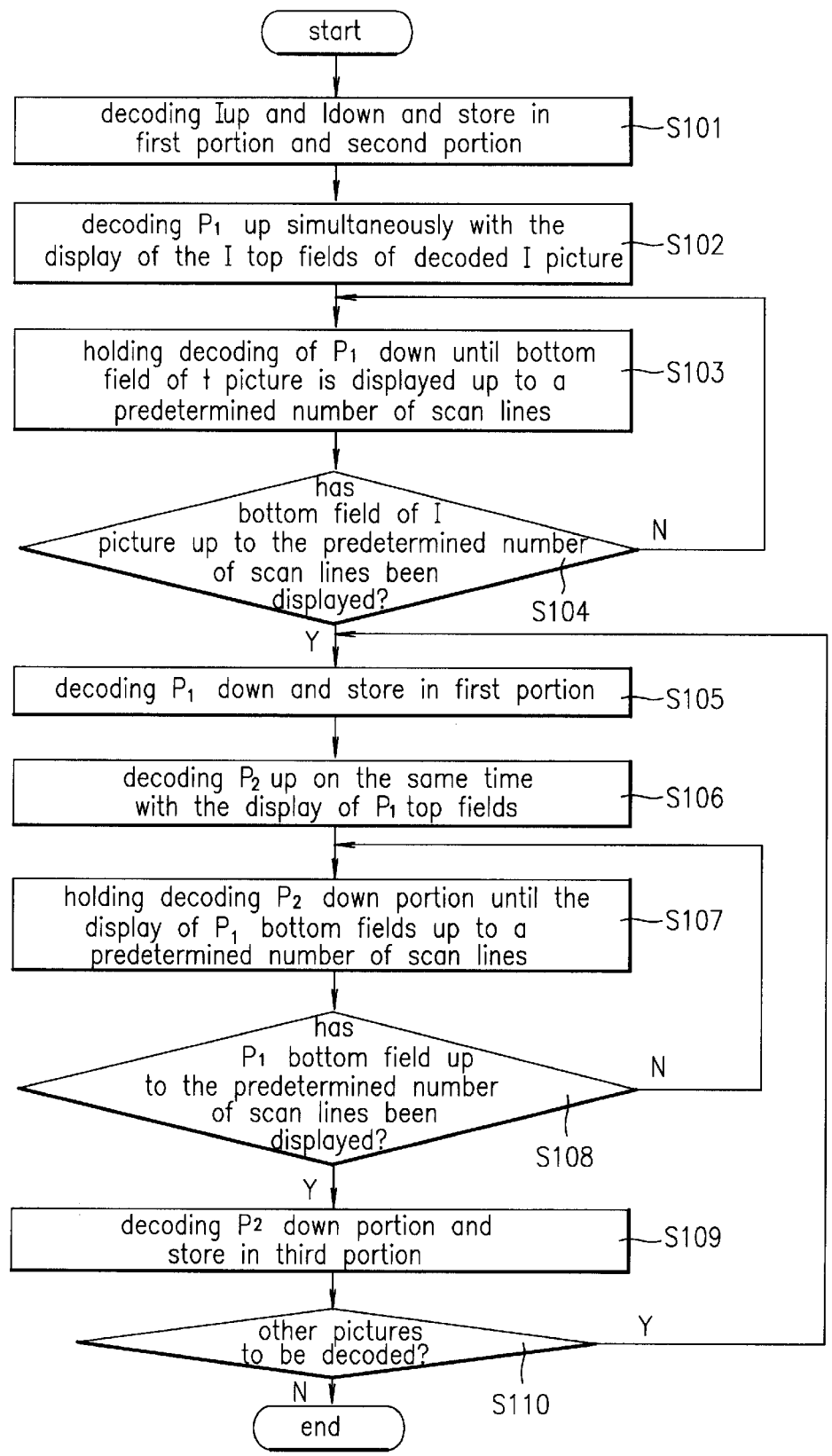
FIG. 6 is a flowchart showing a method for decoding video on a frame memory in an MPEG decoder in accordance with the present invention.

As shown in FIG. 5c and in step S102 in FIG. 6, simultaneously with the display of the decoded top fields of the I picture stored in the first portion 80a and the second portion 80b, the decoder 30 decodes the up portion of the $P_1$ picture video bit stream stored in the second storage region 90 referring to the I picture video bit stream and stores the decoded $P_1$ picture up portion $P_1$ up in the third portion 80c. Then, as shown in FIG. 5d and in step S103 in FIG. 6, the decoder 30 holds decoding of the down portion of the $P_1$ picture until the decoded bottom fields of the I picture stored in the first portion 80a and the second portion 80b are displayed up to a predetermined number of scan lines.

Figure 5E:
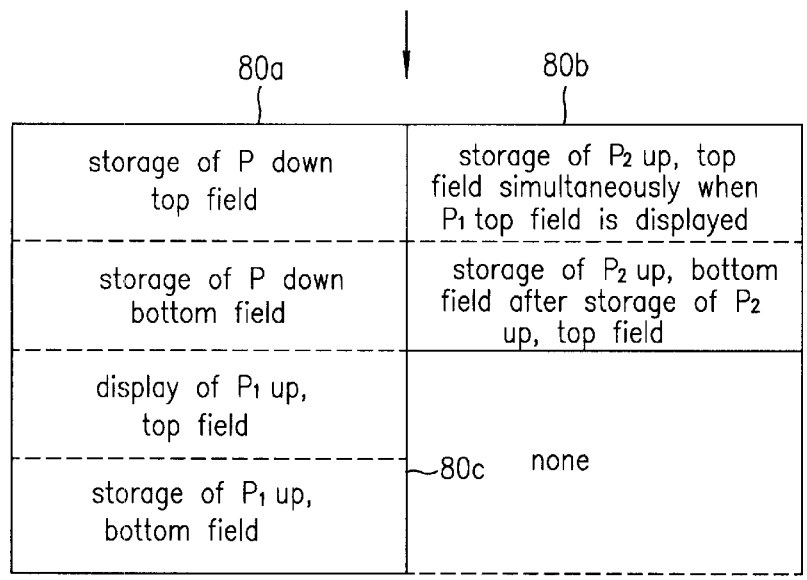

As shown in FIG. 5e and in steps S104 and S105 in FIG. 6, when the bottom fields of the I picture are displayed to the predetermined number of scan lines, the decoder 30 reads in the $P_1$ down portion of the $P_1$ picture video bit stream stored in the second storage region 90 and decodes the $P_1$ down portion with reference to the I picture video bit stream. This decoded $P_1$ picture down portion is stored in the first portion 80a in the order of the top field and then the bottom field.

Then, as shown in FIG. 5e and in step S106 in FIG. 6, simultaneously with the display of the respective top field of the up portion and the down portion of the P₁ picture stored in the third portion 80c and first portion 80a, the controlling part 20 reads in the up portion of the P₂ picture stored in the second storage region 90 and decodes the up portion with reference to the I picture video bit stream. At this time, the second portion 80b of the first storage region 80 is empty. Accordingly, the controlling part 20 sorts out the decoded up portion of the P₂ picture into the top field and bottom field and stores these in the second portion 80b in succession.

Figure 5F:
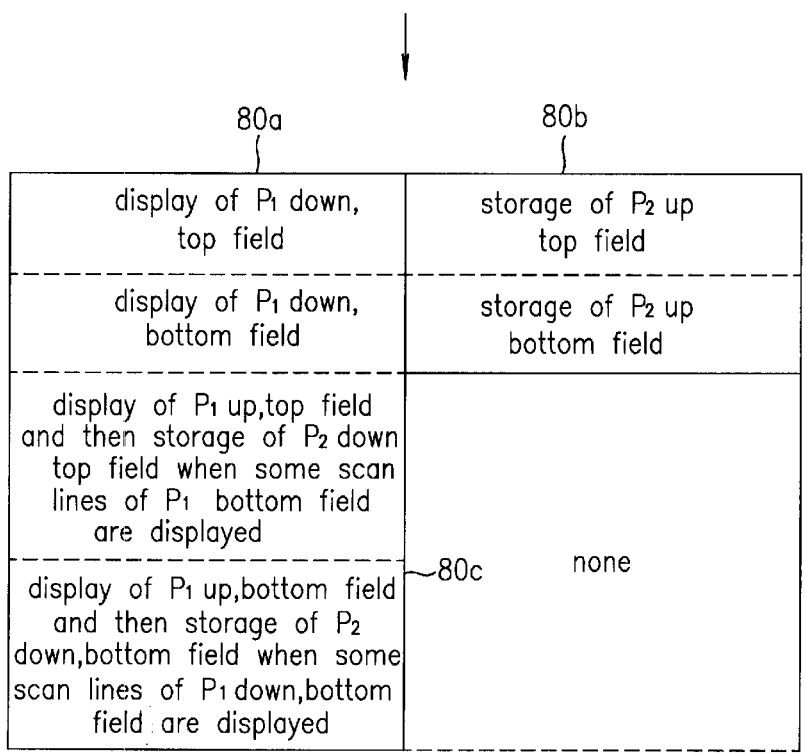

As shown in FIG. 5f and in step S107 in FIG. 6, the controlling part 20 holds decoding of the down portion of the P₂ picture until all the top fields of the up portion and down portion of the P₁ picture stored in the third portion 80c and the first portion 80a, respectively, are displayed. Then, the P₁ picture bottom lines are displayed up to a predetermined number of scan lines.

As shown in FIG. 5f and in step S108 in FIG. 6, the controlling part 20 makes a determination with respect to all of the top fields of the up portion and down portion of the P₁ picture stored in the third portion 80c and the first portion 80a, respectively, having been displayed. Then, in the event the P₁ picture bottom lines being displayed up to a predetermined number of scan lines are found to be actually displayed that much, the controlling part 20 starts to decode the down portion of the P₂ picture. As shown in FIG. 5f and in step S109 in FIG. 6, the down portion of the P₂ picture is decoded after the display of the top field of the P₁ picture and a predetermined number of scan lines of the P₁ picture bottom lines stored in the third region 80c to avoid overlap of the bottom field of the P₁ picture and the down portion of the P₂ picture.

Then, as shown in step S110, the controlling part 20 checks to see if there is another picture to be decoded in the second storage region 90 of the memory 10. If there is another picture video bit stream to be decoded in the second storage region 90, steps S105 to S110 in FIG. 6 are repeated.

Figure 2D:
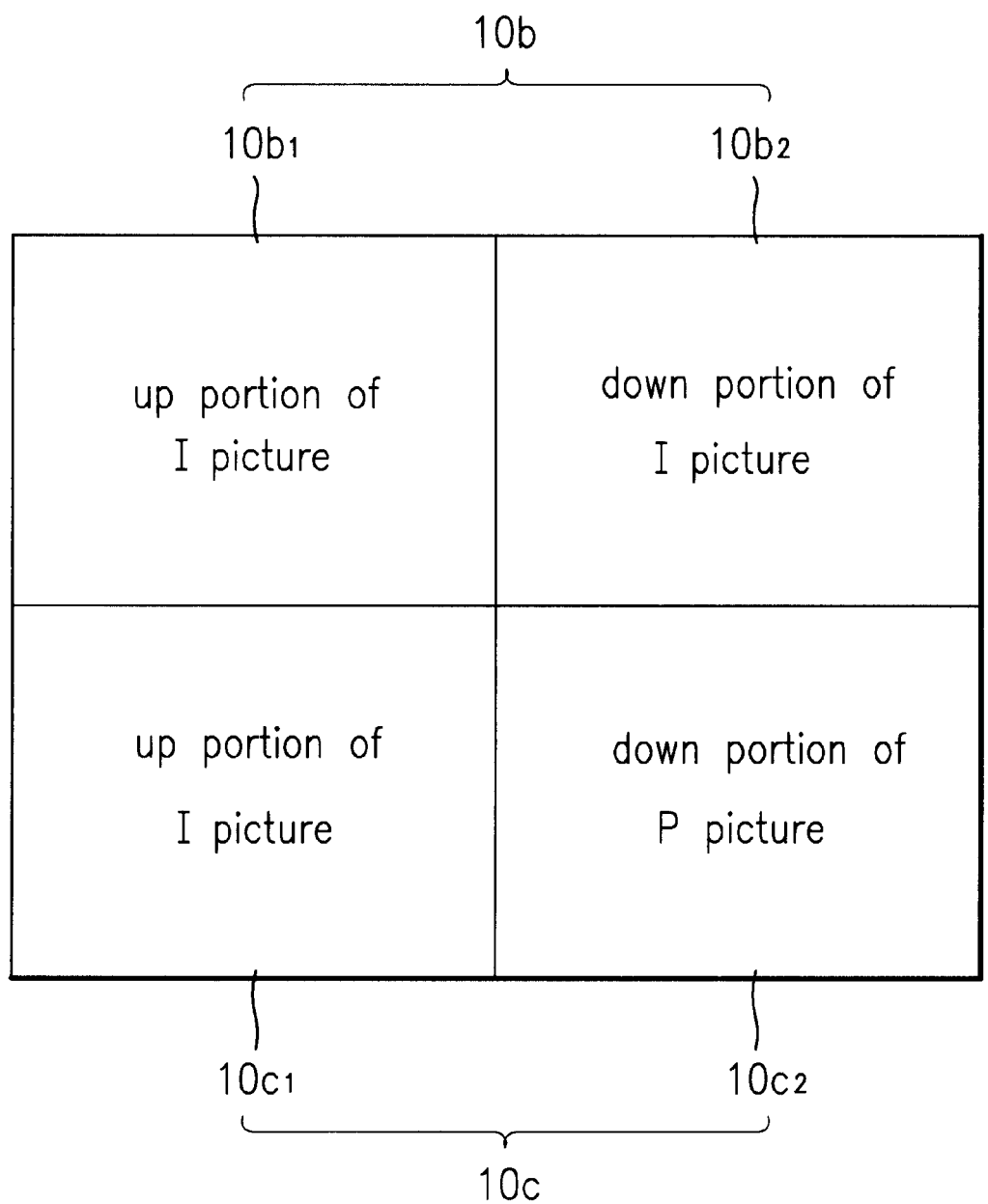
Figure 3:
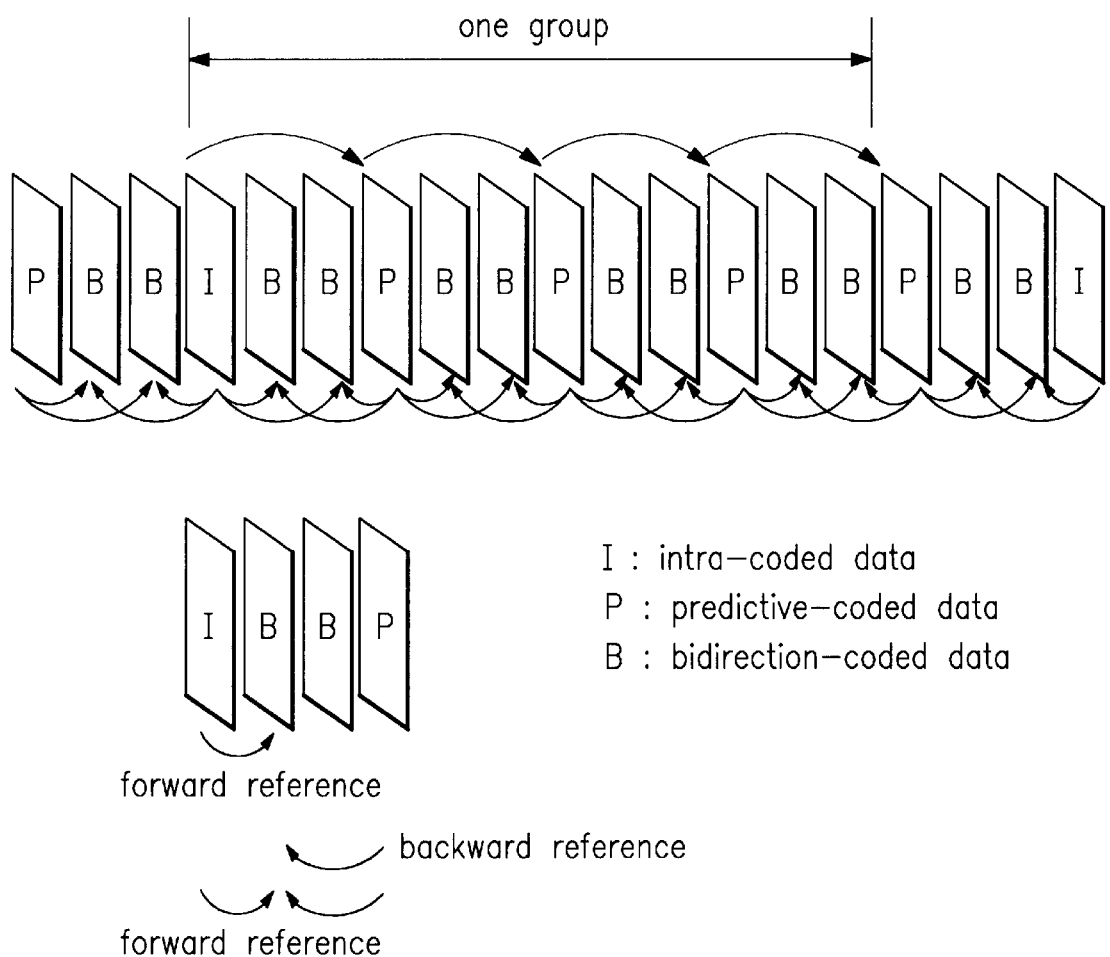
FIG. 3 illustrates a conventional predictive structure between pictures.

In conclusion, the memory size required by the method of the present invention can be reduced by 25% as compared to the memory size required by the conventional method (see FIG. 2d). As has been explained, since the video bit streams have been compressed, i.e., encoded in macro block units, the video bit streams are also decoded in macro block units. As has been explained, the reduced size of memory required for decoding the MPEG standard I and P picture video bit streams according to the present invention results in a lower production cost for the decoder part in video appliances.

It will be apparent to those skilled in the art that various modifications and variations can be made in the method for decoding MPEG standard video bit streams in accordance with the present invention without departing from the spirit or scope of the invention. Thus, it is intended that the present invention cover the modifications and variations of this invention provided they come within the scope of the appended claims and their equivalents.

What is claimed is:

1. A method for decoding MPEG standard video bit streams, the method comprising the steps of:

receiving a video bit stream of an I (Intra-coded) picture and a video bit stream of a P (Predictive-coded) picture in succession and storing the received video bit streams in a first memory, each of the I picture and the P picture having an up portion and a down portion, and each of the up and down portions having a top field and a bottom field;

decoding the stored up portion of the I picture and storing the decoded up portion of the I picture in a first region of a second memory;

decoding the stored down portion of the I picture and storing the decoded down portion of the I picture in a second region of the second memory;

simultaneously decoding the stored up portion of the P picture and displaying the top fields of the up and down portions of the I picture stored in the first and second regions of the second memory and storing the up portion of the P picture in a third region of the second memory; and decoding the down portion of the P picture, waiting for display of the top fields of the up and down portions of the I picture and a predetermined number of scan lines of the bottom fields of the up and down portions of the I picture, and storing the decoded down portion of the P picture in the first region of the second memory.

2. A method as claimed in claim 1, wherein the video bit streams are encoded and decoded in macro block units.

3. A method as claimed in claim 1, wherein each of the received I and P picture video bit streams corresponds to an interlace NTSC broadcasting signal.

4. A method for decoding MPEG standard video bit streams, the method comprising the steps of:

receiving a video bit stream of an I (Intra-coded) picture and a video bit stream of a plurality of P (Predictive-coded) pictures in succession and storing the received video bit streams in a first memory, each of the I picture and the P pictures having an up portion and a down portion, and each of the up and down portions having a top field and a bottom field;

decoding the up portion of the stored I picture and storing the decoded up portion of the I picture in a first region of a second memory;

decoding the down portion of the stored I picture and storing the decoded down portion of the I picture in a second region of the second memory;

decoding the up portion of a stored first P picture video bit stream, and storing the up portion of the decoded first P picture in a third region of the second memory when the top fields of the up and down portions of the I picture stored in the first and second regions of the second memory are displayed;

waiting for display of the bottom fields of the up and down portions of the I picture up to a predetermined number of scan lines;

waiting for decoding of the down portion of the stored first P picture;

when the bottom fields of the up and down portions of the I picture are displayed up to the predetermined number of scan lines, decoding the down portion of the first P picture and storing the decoded down portion of the first P picture in the first region of the second memory;

decoding the up portion of a stored second P picture, and storing the decoded up portion of the second P picture in the second region of the second memory when the top fields of the up and down portions of the first P picture are displayed;

holding decoding of the down portion of the second P picture until the bottom fields of the up and down portions of the first P picture are displayed up to a predetermined number of scan lines;

decoding the down portion of the second P picture and storing the decoded down portion of the second P picture in a third region of the first memory when the bottom fields of the up and down portions of the first P picture are displayed up to a predetermined number of scan lines; and repeating the aforementioned steps when other video bit streams are applied.

5. A method as claimed in claim 4, wherein the video bit streams are encoded and decoded in macro block units.

6. A method as claimed in claim 4, wherein each of the received I and P picture video bit streams corresponds to an interlace NTSC broadcasting signal.

7. A method as claimed in claim 4, where the repeating step is performed when other P picture video bit streams are applied.

8. A method of decoding MPEG standard video bit streams, the method comprising the steps of:

(a) receiving a video bit stream of an I (Intra-coded) picture and a video bit stream of a P (Predictive-coded) picture and storing the received video bit streams in memory, each of the I picture and the P picture having a first portion and a second portion, and each of the first and second portions having a first field and a second field;

(b) decoding the stored first portion of the I picture and storing the decoded first portion of the I picture;

(c) decoding the stored second portion of the I picture and storing the decoded second portion of the I picture;

(d) simultaneously decoding the stored first portion of the P picture and displaying the first fields of the first and second stored portions of the I picture and storing the first portion of the P picture; and (e) decoding the second portion of the P picture, waiting for display of at least a predetermined number of scan lines of the second fields of the first and second portions of the I picture, and storing the decoded second portion of the P picture.

9. A method as claimed in claim 8, wherein the first portion corresponds to an up portion and the second portion corresponds to a down portion.

10. A method as claimed in claim 8, wherein the first field corresponds to a top field and the second field corresponds to a bottom field.

11. A method as claimed in claim 8, wherein step (b) stores the decoded first portion of the I picture in a first region of a first memory, step (c) stores the decoded second portion of the I picture in a second region of the first memory, step (d) stores the first portion of the P picture in a third region of the first memory, and step (e) stores the decoded second portion of the P picture in the first region of the first memory.

12. A method as claimed in claim 11, wherein step (a) stores the received video bit streams in a second memory.

13. A method as claimed in claim 8, wherein, simultaneous with the decoding and displaying of step (d), the up portion of the P picture is stored.

14. A method as claimed in claim 8, wherein the waiting sub-step of step (e) waits not only for display of at least a predetermined number of scan lines of the second fields of the first and second portions of the I picture, but also waits for display of the first fields of the first and second portions of the I picture.

15. A method as claimed in claim 8, wherein the video bit streams are encoded and decoded in macro block units.

16. A method as claimed in claim 8, wherein each of the received I and P picture video bit streams corresponds to an interlace NTSC broadcasting signal.

* * * * *